United States Patent [19]
Couch, Jr. et al.

[11] Patent Number: 5,695,662
[45] Date of Patent: Dec. 9, 1997

[54] PLASMA ARC CUTTING PROCESS AND APPARATUS USING AN OXYGEN-RICH GAS SHIELD

[75] Inventors: Richard W. Couch, Jr., Hanover, N.H.; Nicholas A. Sanders, Norwich, Vt.; Lifeng Luo, Lebanon; John Sobr, Enfield, both of N.H.

[73] Assignee: Hypertherm, Inc., Hanover, N.H.

[21] Appl. No.: 595,797

[22] Filed: Feb. 2, 1996

Related U.S. Application Data

[63] Continuation of Ser. No. 394,707, Feb. 27, 1995, Pat. No. 5,591,357, and a continuation-in-part of Ser. No. 682,991, Apr. 12, 1991, Pat. No. 5,170,033, and Ser. No. 682,992, Apr. 12, 1991, Pat. No. 5,166,494, which is a continuation-in-part of Ser. No. 513,780, Apr. 24, 1990, Pat. No. 5,070,227, said Ser. No. 682,991, is a continuation-in-part of Ser. No. 513,780, said Ser. No. 394,707, is a division of Ser. No. 753,345, Aug. 30, 1991, Pat. No. 5,396,043, which is a continuation-in-part of Ser. No. 395,266, Aug. 17, 1989, Pat. No. 5,120,930, which is a continuation-in-part of Ser. No. 203,440, Jun. 7, 1988, Pat. No. 4,861,962.

[51] Int. Cl.$^6$ ................................................ B23K 10/00
[52] U.S. Cl. ........................... 219/121.39; 219/121.48; 219/121.59
[58] Field of Search ......................... 219/121.48, 121.5, 219/121.51, 121.52, 121.39, 74, 75

[56] References Cited

U.S. PATENT DOCUMENTS

| | | |
|---|---|---|
| 3,204,076 | 8/1965 | Browning . |
| 3,272,962 | 9/1966 | Mauskapf et al. . |
| 3,641,308 | 2/1972 | Couch, Jr. et al. . |
| 4,133,987 | 1/1979 | Lakomsky et al. . |
| 4,275,287 | 6/1981 | Hiratake . |
| 4,382,170 | 5/1983 | Klingel . |
| 4,389,559 | 6/1983 | Rotolico et al. . |
| 4,521,666 | 6/1985 | Severance, Jr. et al. . |
| 4,625,094 | 11/1986 | Marhic et al. . |

(List continued on next page.)

FOREIGN PATENT DOCUMENTS

| | | |
|---|---|---|
| 82357 | 3/1975 | Japan . |
| 50-135721 | 11/1975 | Japan . |
| 51-15795 | 4/1976 | Japan . |
| 52-36725 | 3/1977 | Japan . |
| 57-68270 | 4/1982 | Japan . |
| 57-165370 | 10/1982 | Japan . |
| 64-9112 | 10/1984 | Japan . |
| 62-28084 | 2/1987 | Japan . |
| 63-10082 | 1/1988 | Japan . |
| 63-180378 | 7/1988 | Japan . |
| 55144337 | 4/1991 | Japan . |
| 188276 | 10/1966 | U.S.S.R. . |
| 123104 | 1/1983 | U.S.S.R. . |

*Primary Examiner*—Mark H. Paschall
*Attorney, Agent, or Firm*—Testa, Hurwitz & Thibeault, LLP

[57] ABSTRACT

A plasma arc torch has a secondary gas flow that is extremely large during piercing of a workpiece to keep splattered molten metal away from the torch and thereby prevent "double arcing". The secondary flow exits the torch immediately adjacent the transferred plasma arc and is an extremely uniform, swirling flow. A swirl ring is located in the secondary gas flow path at the exit point. A prechamber feeds gas to the swirl ring, which is in turn fed through a flow restricting orifice. For certain applications the secondary gas is a mixture of an oxidizing gas, preferably oxygen, and a non-oxidizing gas, preferably nitrogen, in a flow ratio of oxygen to nitrogen in the range of 2:3 to 9:1. Preferably the flow ratio is about 2:1. A network of conduits and solenoid valves operated under the control of a central microprocessor regulates the flows of plasma gas and secondary gas and mixes the secondary gas. The network includes valved parallel branches that provide a quick charge capability and a set of venting valves, also electrically actuated by the microprocessor, to provide a quick discharge. In a preferred high-definition embodiment, a nozzle with a cut back outer surface and a large, conical head allows a metal seal and enhanced cooling. A two-piece cap protects the nozzle during cutting.

35 Claims, 7 Drawing Sheets

U.S. PATENT DOCUMENTS

| | | |
|---|---|---|
| 4,692,582 | 9/1987 | Marhic . |
| 4,701,590 | 10/1987 | Hatch . |
| 4,743,734 | 5/1988 | Garlanov et al. . |
| 4,762,977 | 8/1988 | Browning . |
| 4,861,962 | 8/1989 | Sanders et al. . |
| 5,013,885 | 5/1991 | Carkhuff et al. . |
| 5,017,752 | 5/1991 | Severance, Jr., et al. . |
| 5,023,425 | 6/1991 | Severance, Jr. . |
| 5,120,930 | 6/1992 | Sanders et al. . |
| 5,132,512 | 7/1992 | Sanders et al. . |
| 5,393,952 | 2/1995 | Yamaguchi et al. . |

PLASMA ARC CUTTING PROCESS AND APPARATUS USING AN OXYGEN-RICH GAS SHIELD

REFERENCE TO RELATED APPLICATIONS

This application is a continuation of 08/394,707 filed Feb. 27, 1995 now U.S. Pat. No. 5,591,357 which is a Division of 07/753,395 filed Aug. 30, 1991 now U.S. Pat. No. 5,396,043 which is a continuation-in-part of U.S.S.N. 07/395,266 filed Aug. 17, 1989, now U.S. Pat. No. 5,120,930 which in turn is a continuation-in-part of U.S.S.N. 07/203,440 filed Jun. 7, 1988 now U.S. Pat. No. 4,861,962 issued Aug. 29, 1989. This application is also a continuation-in-part of U.S.S.N. 07/682,991 filed Apr. 12, 1991 now U.S. Pat. No. 5,170,033 and U.S.S.N. 07/682,992 also filed Apr. 12, 1991, now U.S. Pat. No. 5,166,494 both of which are in turn continuations-in-part of U.S.S.N. 07/513,780 filed Apr. 24, 1990 now U.S. Pat. No. 5,070,227.

BACKGROUND OF THE INVENTION

This invention relates in general to plasma arc cutting and welding processes and apparatus. More specifically, it relates to a process and apparatus for dual flow piercing and cutting of metal workpieces that is faster, has a better cut quality, and protects the torch against splattered molten metal through the use of a high velocity gas secondary gas flow of well-defined flow conditions and a novel composition.

Plasma arc torches have a wide variety of applications such as the cutting of thick plates of steel and the cutting of comparatively thin sheets of galvanized metal commonly used in heating, ventilating and air conditioning (HVAC) systems. The basic components of a plasma arc torch include a torch body, an electrode (cathode) mounted within the body, a nozzle (anode) with a central exit orifice, a flow of an ionizable gas, electrical connections, passages for cooling and arc control fluids, and a power supply that produces a pilot arc in the gas, typically between the electrode and the nozzle, and then a plasma arc, a conductive flow of the ionized gas from the electrode to a workpiece. The gas can be non-oxidizing, e.g. nitrogen, argon/hydrogen, or argon, or oxidizing, e.g. oxygen or air.

Various plasma arc torches of this general type are described in U.S. Pat. Nos. 3,641,304 to Couch and Dean, 3,833,787 to Couch, 4,203,022 to Couch and Bailey, 4,421,970 to Couch, 4,791,268 to Sanders and Couch, and 4,816,637 to Sanders and Couch, all commonly assigned with the present application. Plasma arc torches and related products are sold in a variety of models by Hypertherm, Inc. of Hanover, N.H. The MAX 100 brand torch of Hypertherm is typical of the medium power torches (100 ampere output) using air as the working gas and useful for both plate fabrication and HVAC applications. The HT 400 brand torch is typical of the high power torches (260 amperes) often using oxygen as the working gas. High power torches are typically water cooled and used to pierce and cut thick metal sheets, e.g. 1 inch thick mild steel plate.

Design considerations of these torches include cooling the torch since the arc produces temperatures in excess of 10,000° C. which if not controlled cold destroy the torch, particularly the nozzle. Another consideration is that the arc must be controlled, both to protect the torch itself from the arc and to enhance the quality of the cut being made in a workpiece. An early invention of one of the present applicants described in U.S. Pat. No. 3,641,308 involved the use of a flow of cooling water in the nozzle of a torch to constrict the arc and thereby produce a better quality cut. It has also been found that the cut quality can be greatly enhanced if the plasma is caused to swirl, as by feeding it to the plasma chambers through a swirl ring having a set of off-center holes.

In cutting parts from sheet metal, a cut often begins by piercing the sheet at an interior point. Because the metal is not cut through when the piercing begins, the molten metal cannot run out of the kerf under the force of gravity. It is therefore splashed upwardly onto the torch. This is undesirable because the metal can destabilize the arc, causing it to gouge the nozzle, and it can adhere to the nozzle, which will often lead to double arcing, where the plasma arc flow from the electrode to the nozzle, and then to the workpiece via a conduction path of molten metal. Both gouging and double arcing reduce the nozzle life, or destroy it. It is also important that the resulting cut be smooth, as free of dross as possible, and have a cut angle that is preferably at or near 0°, that is, with the "good" side of the kerf having a surface that is perpendicular to the metal sheet itself.

In the past, to control gouging and double arcing due to splattered metal, the solution for high current (200 amperes or more) torches has been to use a multi-piece nozzle with water injection cooling. Typical such nozzles sold by Hypertherm, Inc. are illustrated in schematic form in FIGS. 1A and 1B. Hypertherm Model Nos. HT400 0.099, HT400 0.166 and PAC500 0.187 correspond to FIG. 1a and use a ceramic nozzle face cooled by water. FIG. 2B shows a variation on this design which is sold by Hypertherm, Inc. as its Model PAC500 0.250.

For low current operation, 0–200 amperes, water injection cooling is less practical due to its cost and the energy drain from the plasma by the water cooling. The common commercial solution for low power, air cooled torches was simply to allow the metal to attach the torch parts and then replace them. A typical nozzle life such for such a torch operating at 40–50 amperes when piercing and cutting ¼ inch mild steel is about one hour. There is clearly a cost associated with the replacement parts, the productive time lost during the replacement process, as well as safety considerations that arise whenever a torch is disassembled and reassembled.

Gas cooling of nozzles is also known. It usually involves a dual flow, that is a primary flow of a plasma gas and a secondary flow. They can originate at a common inlet, or separate inlets. The primary flow must be formed by an ionizable gas; the secondary flow is not necessarily ionizable. The primary flow passes through the plasma chamber where it is ionized and exits the torch through its nozzle to form a plasma jet. The secondary gas flows outside the nozzle to form a cold layer of non-ionized gas around the arc. In conventional torches the temperature and velocity of the primary or plasma gas are much higher than those of the secondary gas flow.

While the cutting capabilities of the torch are principally a function of the plasma jet, the secondary flow can be important to cool the torch and to create a protected gaseous environment at the workpiece. FIG. 2A shows a typical use of a secondary flow of gas over the outer surface of a nozzle toward the workpiece. This arrangement is used for low current applications; nozzles of this type are sold by Hypertherm, Inc. as its model Nos. HT40 0.038 and MAX100 0.059. FIG. 2B show another gas cooling arrangement with a ceramic insulating sleeve at the lower end of the nozzle to protect the nozzle against contract against the workpiece. The ceramic, however, is brittle and this arrangement offers no protection of the nozzle during piercing.

U.S. Pat. No. 4,389,559 to Rotolico et al. and U.S. Pat. No. 4,029,930 to Sagara et al. are examples of plasma torches for underwater spraying and welding applications, respectively where a sheath of secondary gas shields the zone where the arc is acting against the surrounding atmosphere, whether air or water. U.S. Pat. No. 4,816,637 to Sanders and Couch discloses a high current underwater cutting torch with an inwardly directed radial flow of air at 0 to 10 scfm in combination with an annular water sheath to create a water-free cutting zone and to sweep away hydrogen gas that would otherwise accumulate under the workpiece.

As noted above, the ability of a plasma torch to pierce is very important in a plasma cutting process. The commonly assigned U.S. Pat. No. 4,861,962 to Sanders and Couch discloses the use of a metallic, electrically floating shield that substantially surrounds the nozzle to block metal splattered on piercing. A secondary gas flow between the shield and the nozzle cools these components. Canted ports upstream introduces a swirl into the secondary flow to help stabilize the arc and improve the cut quality. Bleed ports in the shield also draw off a portion of the cooling flow to allow an increased overall flow for better cooling without destabilizing the arc during cutting. This solution is, however not adequate for high-definition (sometimes termed high-density) torches which have a concentrated arc and require more cooling than a gas can provide. The secondary flow is relatively low in order to maintain the cut quality. The gas functions to cool the torch and to assist in stabilizing the arc.

In dual flow torches, when the primary gas is oxygen or air, the secondary gas is usually air. When the primary gas is nitrogen, the secondary gas is usually carbon dioxide or nitrogen. These combinations produce a suitable plasma jet without an unacceptable level of interference by the secondary gas with the cut. With these secondary gases, the kerf usually exhibits a positive cut angle of 1 to 2 degrees and top and bottom dross. Cut speed and quality are otherwise about the same as if no shield was used.

It is also known to provide different gases, or mixes of gases, for different phases of the cutting operation. For example, Japanese Published Document No. 57-68270 of Hitachi Seisakusho K. K. discloses a preflow of argon during a pilot arc phase, and a switch to hydrogen gas for the cutting, followed by a return to argon after the cutting is terminated. Japanese Published Application No. 61-92782 of Koike Oxygen Industry, Inc. which discloses a nitrogen-oxygen mix as a preflow plasma gas on start up, followed by an oxygen plasma flow. Both of these flows are for the plasma gas, not a secondary gas. This publication teaches that a plasma or primary gas preflow of about 85% nitrogen, 15% oxygen is best to extend electrode life. U.S. Pat. No. 5,017,752 to Severance et al. discloses a flow of a non-oxidizing gas during pilot arc operation which is switched to a pure oxygen flow when the arc transfers. These flows are, again, of primary gas only. Various patents and publications also disclose patterns of gas flow and timing considerations. U.S. Pat. No. 4,195,216 to Beauchamp et al., for example, discloses various modes of operating a plasma-wire welder in a manner that fills the keyhole at the end of the weld by adjusting the wire feed rate in coordination with changes in the gas flow and the arc current.

Applicants are not aware of a torch where an extremely high velocity flow of a secondary gas is used as a gas shield to protect the nozzle and other torch components adjacent the workpiece against splattered molten metal on piercing. Heretofore the lack of uniformity of the flow and flow hysteresis have made the direct interaction of a high velocity gas flow with the plasma jet a situation to be avoided.

Applicants are also not aware of the use of a mixture of gases as a secondary gas flow in order to speed the cut and/or increase the cut quality adjustably through a change in the mix of gases forming the secondary gas. In particular applicants are not aware of any secondary gas flow using a mixture of nitrogen and oxygen where the ratio of gases in the mixture is opposite to that of air. Applicants are also not aware of a high definition plasma arc torch that uses a gas shield, this mixture of secondary gases, or flow controls that allow sudden, precise and large changes in the gas flow rates through the torch.

It is therefore a principal object of this invention to provide a plasma arc torch and method of operation that protects the torch against gouging and double arcing during piercing.

Another principal object of this invention is to provide a plasma arc torch and method of operation which increases cutting speed and produces a kerf of enhanced cut quality.

A further object of this invention is to provide the foregoing advantages for a high-definition torch.

Another object is to provide the foregoing advantages, including a cut that has a smooth side surface, a good cut angle, and is substantially free of top dross.

Still another object is to provide the foregoing advantages and also the ability to adjust the cutting operation to adapt to different materials and cutting requirements depending on the application without any changes in equipment.

SUMMARY OF THE INVENTION

A plasma arc cutting system according to this invention has a dual gas flow, with a secondary flow at an extremely high rate, e.g. 120 scfh, during a piercing of a sheet metal workpiece, as compared to a typical operating flow rate of 20 scfh. The high velocity secondary flow is directed radially inwardly onto the arc. This flow is characterized by an extreme uniformity in time and space, a swirling flow pattern, and the close positioning of an annular exit orifice with respect to the transferred arc. The secondary flow is preferably a mixture of oxygen and nitrogen. At least 40% of the flow is oxygen, and the flow rates are in a range of flow rate ratios of about 2:3 to about 9:1. Preferably the flow rate ratio is about 2:1. The plasma gas flow for a high definition torch with a rating of 15 amperes is typically 7 scfh. The present invention also includes primary and secondary gas flow controls that allow a quick charging and discharging of the flow lines in order to accommodate sudden large changes in flow rates without loss of control over the arc.

The plasma arc torch has a secondary gas cap mounted on its lower end with a front face interposed between a nozzle mounted on the torch and the workpiece. In the preferred form of high definition torch, a water-cooled cap is mounted between the nozzle and the secondary gas cap to define a water cooled chamber adjacent the outer surface of the nozzle for high efficiency cooling. A swirl ring is mounted between the water cooled cap and the secondary gas cap immediately upstream of the annular exit orifice. It contains a set of canted holes that introduce a swirl in the gas passing through it. A prechamber is upstream of the swirl ring, fed by a flow restricting orifice to create a pressure drop in the secondary gas feed line across the water-cooled cap. This pressure drop, prechamber and downstream swirl ring produce the flow characteristics of the present invention.

The nozzle is characterized by a large head that surrounds an exit port for the plasma jet and a sharp cut back or recess to a conical body portion. This nozzle design promotes cooling of the nozzle and allows a reliable metal-to-metal seal of the nozzle to a water-cooled cap, or equivalent component. The secondary gas cap has a first, generally cylindrical portion that mounts on an insulating member, a transition portion that inclines toward the plasma jet, and a replaceable face portion that extends over the lower end of the torch, opposite the workpiece, with a central port aligned with the exit port of the nozzle and closely surrounding it. Preferably the face portion has a set of bleed/vent ports angled away from the jet, a locating and mounting recess at its outer edge, a groove to hold an o-ring seal, and a locating groove for the swirl ring.

The flow controls of the present invention include a microprocessor controlled network (or "circuit") of conduits, valves, meters, and vents that provide a primary gas and a mixed secondary gas in variable ratios of two gases at multiple preselected flow rates, e.g. a preflow and an operating flow. In a preferred form oxygen and nitrogen supply lines each feed a flow meter that makes the flow rate independent of the upstream pressure. The oxygen supply flows to the plasma gas line and to a secondary gas circuit. These two oxygen flow lines and one nitrogen flow line in the secondary circuit each has a solenoid actuated flow meter bypass valve, followed by three parallel branches that each have another solenoid actuated valve and a needle valve. One branch establishes a preflow. A second branch establishes an operating flow. The third branch allows a sudden increased flow of gas to provide a "quick charge". This quick charge is due to a flow path that bypasses the flow restricting valves in the other branches.

The output of the oxygen and nitrogen secondary gas lines are combined into a single secondary feed conduit leading to the secondary gas inlet at the torch. This feed conduit and the primary and secondary gas feed lines adjacent the torch are vented to atmosphere through a solenoid actuated three way valve. Opening of the two vents in the secondary gas-line briefly during the transfer from a pilot arc mode to a transferred arc mode allows the secondary gas flow to drop quickly to its operating value for cutting. Opening all three vents on plasma cut off provides a quick discharge of the gas flows to the torch. In order to have a strong secondary gas flow throughout piercing, there is a time delay between the transfer of this plasma to the workpiece and the switching from the preflow to the operating flow of the secondary gas. These and other features and objects of the present invention will be more fully understood from the following detailed description which should be read in light of the accompanying drawings.

DETAILED DESCRIPTION OF THE PREFERRED EMBODIMENTS

Figure 1A:
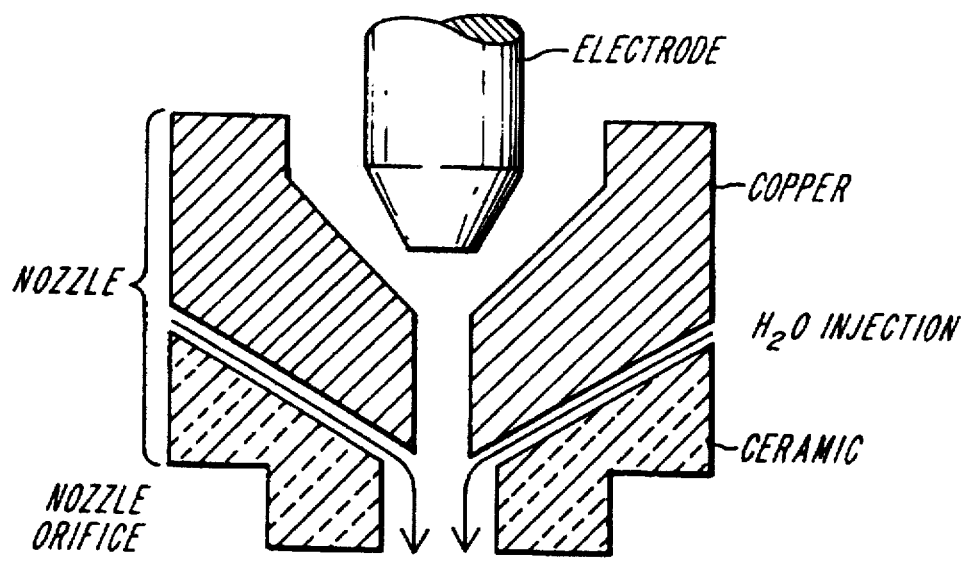
FIG. 1A is a simplified view in vertical cross section of a prior art electrode and multi-piece nozzle of a high-current, water-injection plasma arc torch.
Figure 1B:
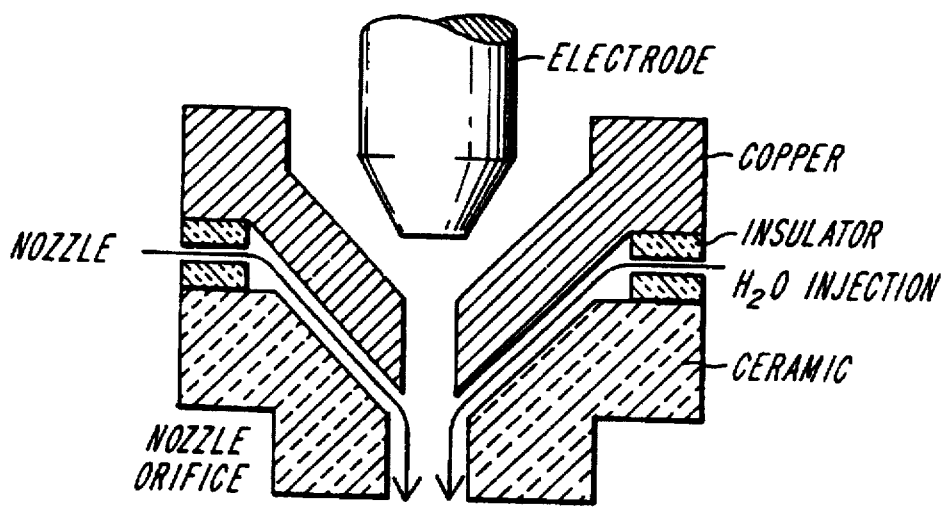
FIG. 1B is a view corresponding to FIG. 1A of an alternative prior art multi-piece, water injection nozzle.
Figure 2A:
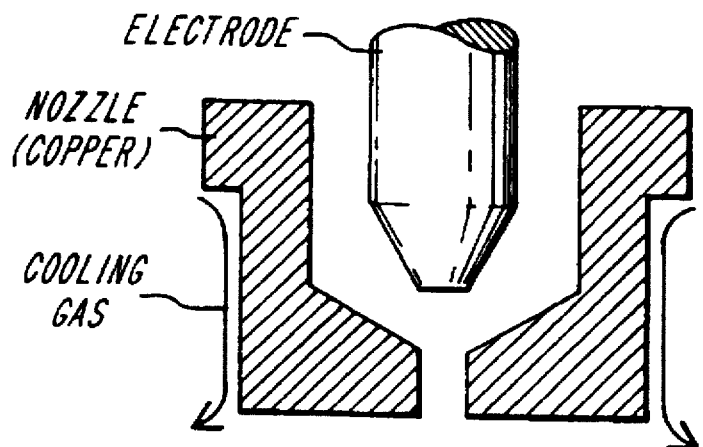
FIG. 2A is a simplified view in vertical cross section of a prior art one-piece nozzle of a plasma arc torch for use with low currents.
Figure 2B:
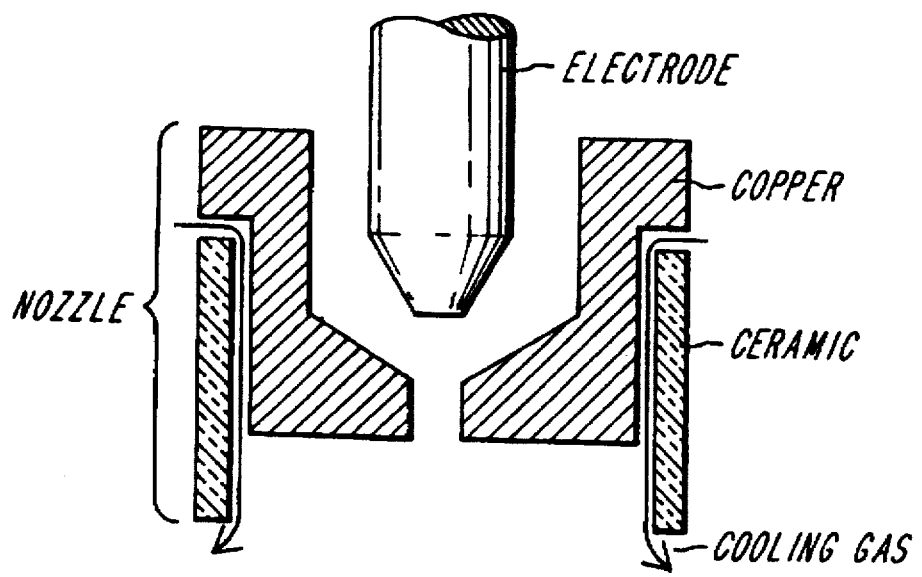
FIG. 2B is a view corresponding to FIG. 2A of an alternative prior art one piece nozzle embodiment for low current use using a cylindrical ceramic shield.
Figure 3A:
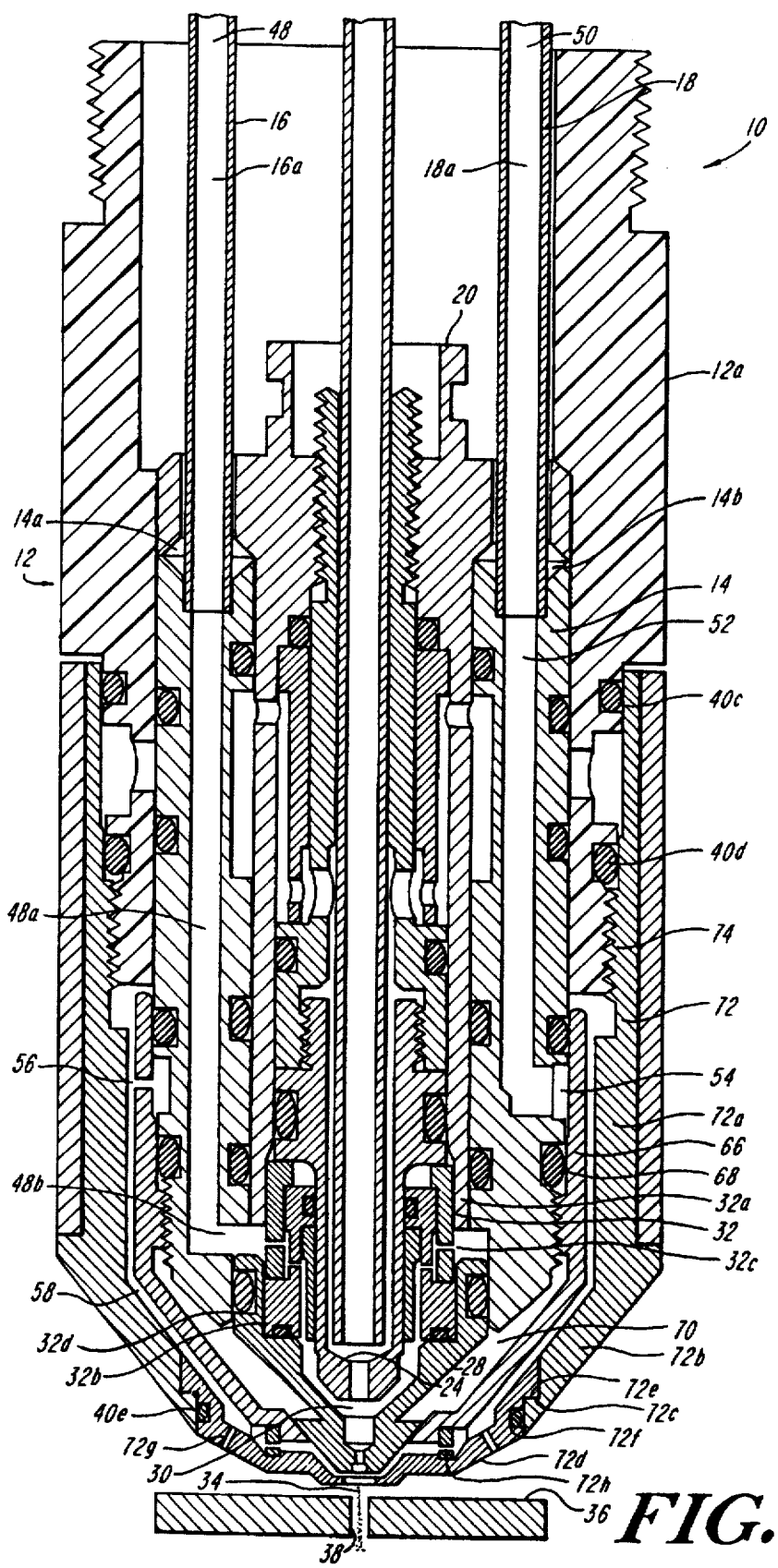
FIG. 3A is a view in vertical section of a high definition water and air cooled plasma arc torch according to the present invention which shows the plasma gas and secondary gas passages.
Figure 3B:
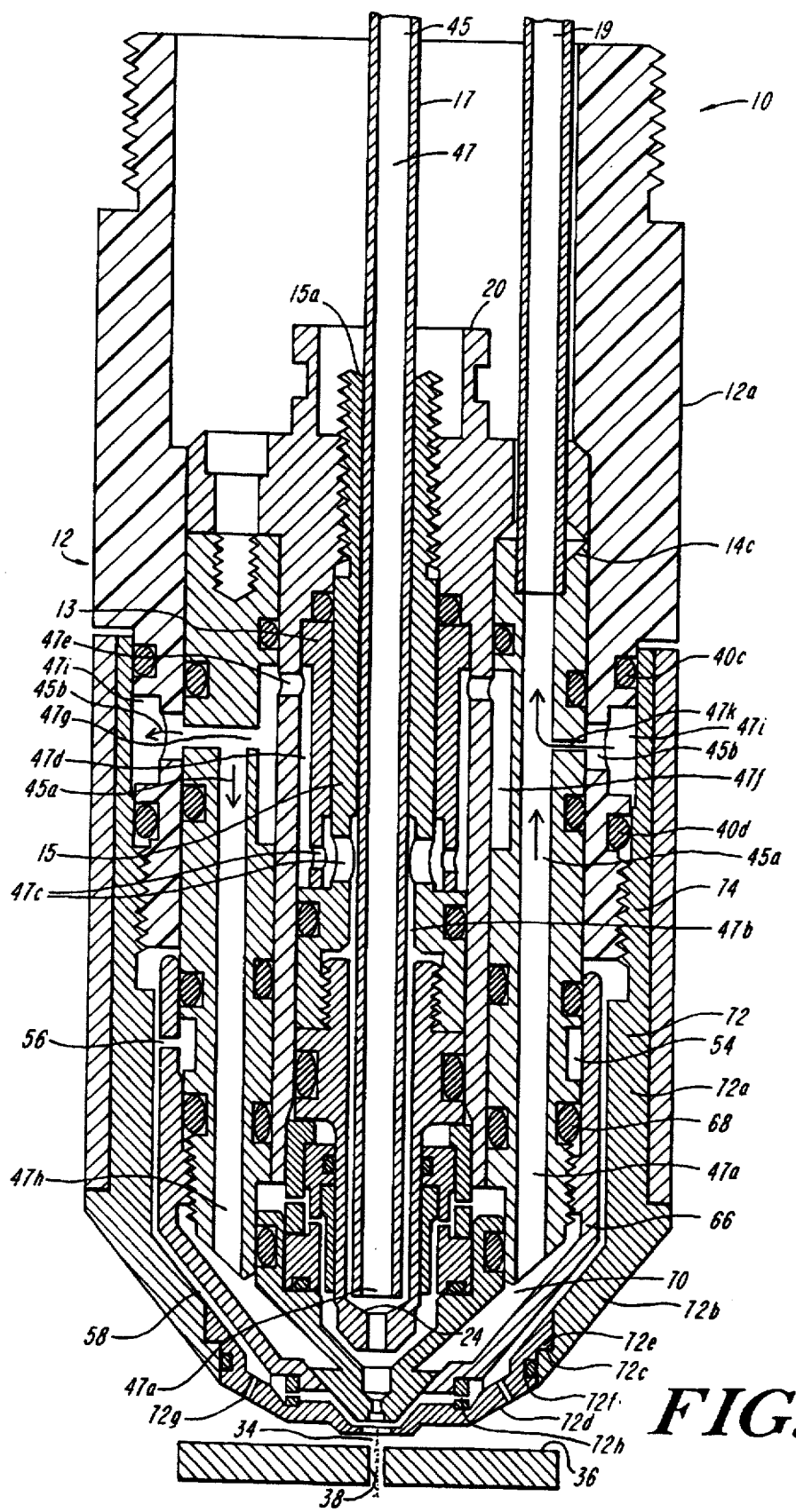
FIG. 3B is a view in vertical section of the present invention showing the water cooling passages.
Figure 3C:
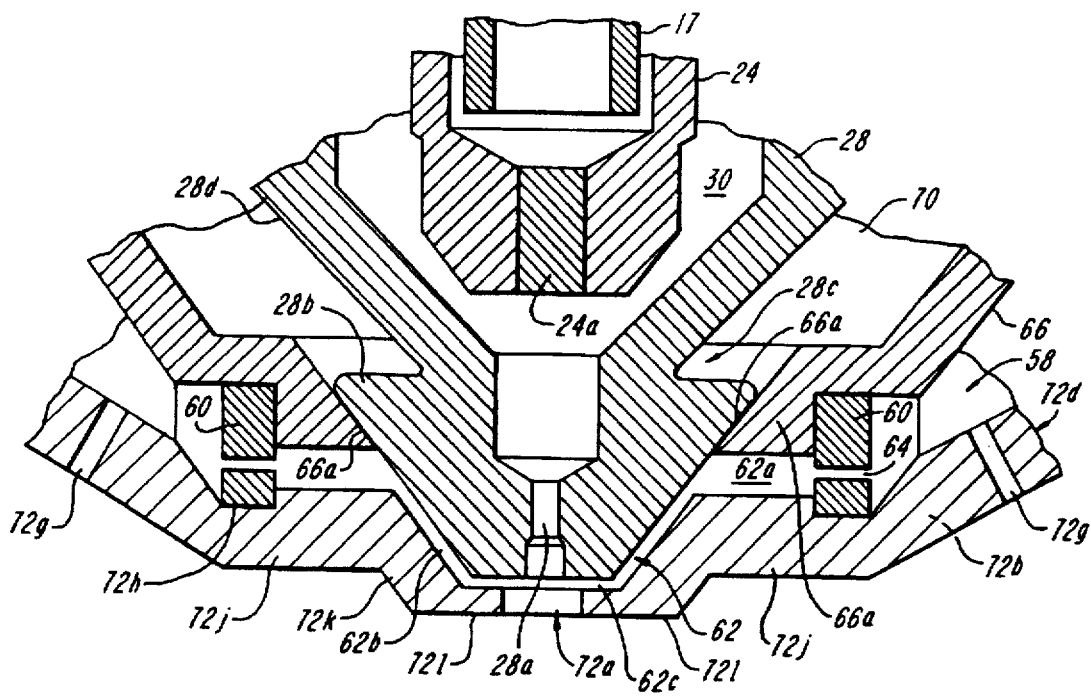
FIG. 3C is a detailed view in vertical section of the nozzle and exit port area of the torch shown in FIG. 3A.
Figure 3D:
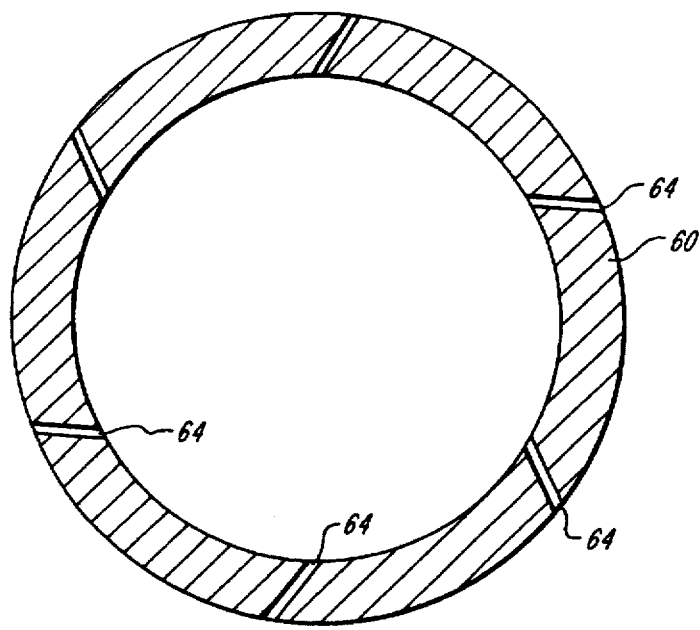
FIG. 3D is a view in horizontal section of the swirl ring shown in FIG. 3A.

FIGS. 3A and 3B show a plasma arc torch 10 according to the present invention. It has a multi-component body 12 including a generally cylindrical main body portion 12a formed of an insulating material such as FR4 fiber glass or Delrin. Anode block 14 secured in the body portion 12a has an opening 14a that receives a plasma gas conduit 16 and an opening 14b that receives secondary gas conduit 18, both the plasma gas conduit 16 and the secondary gas conduit 18 pass through an insulator block 20. A nozzle 28 is mounted immediately below an electrode 24 in a spaced relationship to define a plasma arc chamber 30 therebetween where plasma gas fed from a swirl ring 32 is ionized to form either a pilot arc between the electrode and the nozzle or a transferred arc, or plasma jet, 34 between the electrode and a workpiece 36. The jet 34 pierces the workpiece and then cuts a kerf 38. Note that swirl 32 is comprised of two pieces 32a and 32b. Radial ports 32c on swirl ring port 32a distribute the plasma gas flow evenly to injection ports 32d on swirl ring port 32b. The electrode 24 has a hafnium insert 24a.

As shown, the nozzle has a configuration specially adapted for a high definition torch with a narrow exit port 28a, a large diameter nozzle head 28b to act as a good heat sink, a severe cutback or recess 28c, and a conical body portion 28d. This design provides good heat transfer and therefore cooling of the nozzle by water circulated over the outside of the nozzle. It also facilitates a reliable metal-to-metal seal at 66a between the nozzle head and a like inclined end surface of a water-cooled cap 66. The various component parts are assembled with fluid tight seals provided by sets of o-rings each seated in an associated annular groove, and the metal seal 66a.

A gas source 42 provides a flow of a plasma gas through a primary gas control circuit 44a (FIG. 4) to a plasma gas inlet 10a of the torch 10. A source 46 of a second gas flows through a flow control circuit 44b to a secondary gas inlet 10b of the torch. The secondary gas in the preferred form shown includes a mix of gases from both sources, as is discussed in more detail below. In the torch the plasma gas follows a flow path 48 that includes tube passage 16a, vertical passage 48a, radial port 48b to the swirl ring 32 and then to the plasma chamber 30 where it is ionized. The secondary gas follows a flow path 50 that includes tube passage 18a, a vertical passage 52, a radial port 54, a flow restricting orifice 56, a prechamber 58, a secondary gas swirl ring 60 and an annular exit orifice 62.

"This secondary flow path, and in particular orifice 56, prechamber 58 and the swirl ring 60 is a principal feature of this invention. It introduces a high degree of flow uniformity and control over the flow at a point immediately adjacent to the transferred plasma arc 34. The swirl ring 60 contains a set of off-center, or canted holes 64 which introduce a swirling movement to the flow which facilitates the interaction of the secondary gas stream with the jet 34 and has a beneficial effect on the cut quality. The swirl ring is formed of an insulating material such as a high temperature plastic, preferably the product sold by I. E. du Pont de Nemours under the trade designation Vespel. As shown, the exit orifice 62 has a flat annular portion 62a, a conical portion 62b directed downwardly and radially inward, and a final flat annular portion 62c that is generally parallel to the workpiece 36. The orifice passages 62b and 62c mirror the outer dimensions of the adjacent nozzle surfaces.

The prechamber 58 acts as a local gas supply to the swirl ring 60. The flow restricting orifice 56 creates a pressure drop at the opposite end of the prechamber 58 from the swirl ring. The orifice 56 and prechamber 58 isolate the swirl ring from upstream pressure and flow rate fluctuations. To draw an electrical analogy, the orifice 56 and prechamber 58 act as a smoothing capacitor in an a.c. circuit. On shut off, when the arc current is cut off, the gas in the plasma chamber cools rapidly, leading to a sudden outrush of gas. Gas in the secondary flow path, absent this invention, would be drawn out in this outrush by the Venturi effect. However, the orifice 56 chokes off the outrush so that only the comparatively small supply of gas in the prechamber 58 is drawn out. This supply is calculated to continue the arc stabilization of the secondary gas during cut off, but to have the secondary gas flow cease generally coincident with the extinction of the arc. This arrangement provides a secondary flow from the exit orifice 62 which is high uniform, both in time and spatially.

In the high definition torch of FIG. 3A–3D, the arc is highly constricted as compared to conventional plasma arcs. It also has a high energy density. In a standard plasma cutting torch the current density is approximately 25,000 Amp/sq. inch; in a high density plasma the current densities can be as high as 80,000 Amp/sq. inch, measured in the nozzle base. A 15 ampere current is typical. Water cooling has been found to be necessary. To this end, the water-cooled cap 66 is threaded into the lower end of the anode block 14, with an o-ring seal at 68 and the face-abutting metal-to-metal seal 66a to the upper edge of the nozzle head 28b. Water flow 45a is passed through a water chamber 70 defined by the cap 66, the outer surface of the nozzle 28 and the lower end of the anode block 14. The cooling water 45 flows into the torch through passages 47 which includes water inlet tube 17 which is fitted into opening 15a in the cathode block 15. Water flows from the tube outlet 47a through annulus 47b, radial holes 47c in both the cathode block 15 and insulator 13, annulus 47d, radial holes 47e, annulus 47f to the drill holes 47g. Here the flow splits into two flows 45a to the nozzle and 45b to the secondary cap via vertical passage 47h and annulus 47i respectively. Flow 45a returns from chamber 70 via vertical passage 47j which joins returning flow 45b at hole 47k then flows out of the torch through tube conduit 19 which is fitted to nozzle block 14 at opening 14c.

Another principal feature of this invention is a secondary gas cap 72 threaded at 74 to the insulating body and gas sealed by o-rings 40c and 40d to the body. The secondary gas cap has a first portion including a cylindrical body 72a terminating in conical wall portion 72b with a step 72c in its side wall. A second or face portion 72d includes a step 72e that mates with step 72c, a groove 72f that holds o-ring 40e, vent ports 72g, a recess 72h that holds and positions the swirl ring 60 at its lower edge, an exit orifice 72i centered on the nozzle exit orifice and closely spaced around the plasma jet, and wall portions 72j, 72k and 72l that mirror the nozzle in a parallel spaced relationship and define together with the nozzle the exit orifice 72i.

The cap 72 is in a parallel spaced relationship with the cap 66 with the gap between them defining the prechamber 58. The secondary gas cap not only defines the secondary flow path, it also acts during piercing as a mechanical shield against splattered metal. The lower portion of the cap, particularly the face piece 72d, intercepts any molten metal sprayed upwardly that is not swept away by the gas shield of the present invention, that is, a strong shielding flow of secondary gas this impinges on the plasma jet and is turned to flow radially outwardly between the cap 72 and the workpiece. Note that the central exit orifice 72i has a very small diameter to closely surround the plasma jet 34 with as small a clearance as is possible without risking gouging. The shield is also electrically floating. It is mounted on an insulating material, the body part 12a, and is spaced from adjacent metallic members such as the nozzle 28 and water cooled cap 66, and the swirl ring 60 is formed of an insulating material. As a result, should any molten metal adhere to it, it will not be part of a conductive path for a double arcing. The vents 72g encircle the exit orifice 72i. They are sized and numbered so that during the cutting operation of the torch, they divert or bleed off a sufficient portion of the secondary flow to atmosphere that the flow reaching the plasma jet does not adversely impact on its operation. To this end, the ports are preferably canted away from the plasma jet at a small acute angle, as shown. On the other hand, on start up and during piercing, very high flow rate causes the secondary gas flow to blow by the vents 72g with little diversion of the flow to atmosphere through them. On shut down, as the secondary gas pressure in the path 50 and prechamber 58 drops, the vents 72g provide a vent path to atmosphere to assist in rapidly decreasing the secondary gas pressure. Note that because the face piece 72d is a separate component of the torch, if it becomes worn or damaged it can be replaced without replacing the entire cap 72.

By way of illustration, but not of limitation, a torch 10 having a rating of 15 amperes has an overall diameter of about 1.5 inches, exit orifice 72i, has a diameter of about 0.060 inch, a swirl ring 60 has an inside diameter of 0.300 inch and outside diameter of 0.400 inch and 6 equiangularly spaced, off-center holes 64 with a diameter of 0.016 inch. The flow restriction orifice 56 has a diameter of 0.030 inch and the prechamber 58 has an internal volume of approximately 0.500 sq. inches. The exit orifice has a radial flow path from the swirl ring 60 to the outer diameter of the exit orifice 72i of about 0.008 inch. The vents 72g are twelve in number and have a diameter of 0.16 inch.

Another principal feature of this invention is the use of a secondary gas that is a mixture of a non-oxidizing gas—such as nitrogen, argon, helium, or any of the inert gases—and an oxidizing gas such as oxygen or air, where the oxidizing gas comprises at least 40% of the mixture, measured by flow rates. In the preferred form, with oxygen as the plasma gas, the secondary gas is formed of a mixture of oxygen and nitrogen (argon) with their respective flow rates in a ratio in the range of about 2:3 to about 9:1, and preferably about 2:1. The 2:1 preferred ratio is almost exactly opposite to the ratio of these gases forming air. The gases are commercially pure and are substantially free of water and oil. When these gases are used in this ratio as a shield gas as described above with respect to FIGS. 3A, 3B, 3C and 3D, the cutting speed of the torch in mild steel has been found to increase dramatically. In addition, the cut angle changes from 1° to 2° positive with an air shield to about 0°, or generally perpendicular to the workpiece. Further the top dross can be controlled to a point where it is negligible.

The exact flow ratio for the oxygen and nitrogen flows forming the secondary gas can be determined empirically by cutting with the torch and adjusting the flows until the cut angle or other cut parameter or parameters are optimized. In making these adjustments it has been found that an increase in the oxygen flow will increase the cutting speed (up to about three times the speed of a conventional cutting speed with no gas shield). It also causes the cut angle to become very negative, up to 4° to 5° for a pure oxygen flow. Also, the cutting surface becomes increasingly rough and it exhibits a zig-zag pattern. The reason for these effects is not well understood, but it is believed that a rich oxygen environment surrounding the plasma jet assists a chemical reaction between the metal and the oxygen which releases thermal energy that assists in melting the metal. The cut angle may also be explained as an effect of the oxygen secondary flow on the shape of the plasma jet 34.

Increasing the nitrogen flow, on the other hand, appears to influence cutting speed only to the extent such an increase is at the expense of the oxygen flow rate. A pure nitrogen flow is characterized by a cutting angle that is 2° to 3° positive, a smooth cut surface, and some increase in dross as compared to cutting with no shield gas. It has been found that by changing the oxygen-nitrogen mixing ratio and the total secondary gas flow one can adjust the cutting angle from about positive three degrees to negative three degrees. An increase in the oxygen in the mix and an increase in the total flow makes the cut angle more negative. Thus, the cutting angle can be tuned to a desired value simply by changing the secondary gas mixture, rather than by changing the geometry of the torch, as was the case in the past. Also, when the cut angle is maintained at a zero or negative value, top dross is substantially eliminated.

The oxygen rich secondary gas mixture of the present invention also improves the piercing capabilities of the torch 10. A pierced hole made with an oxygen rich secondary gas according to the present invention is cleaner and can penetrate greater thicknesses of sheet metal than identical torches operating with different mixtures such as air.

Figure 4:
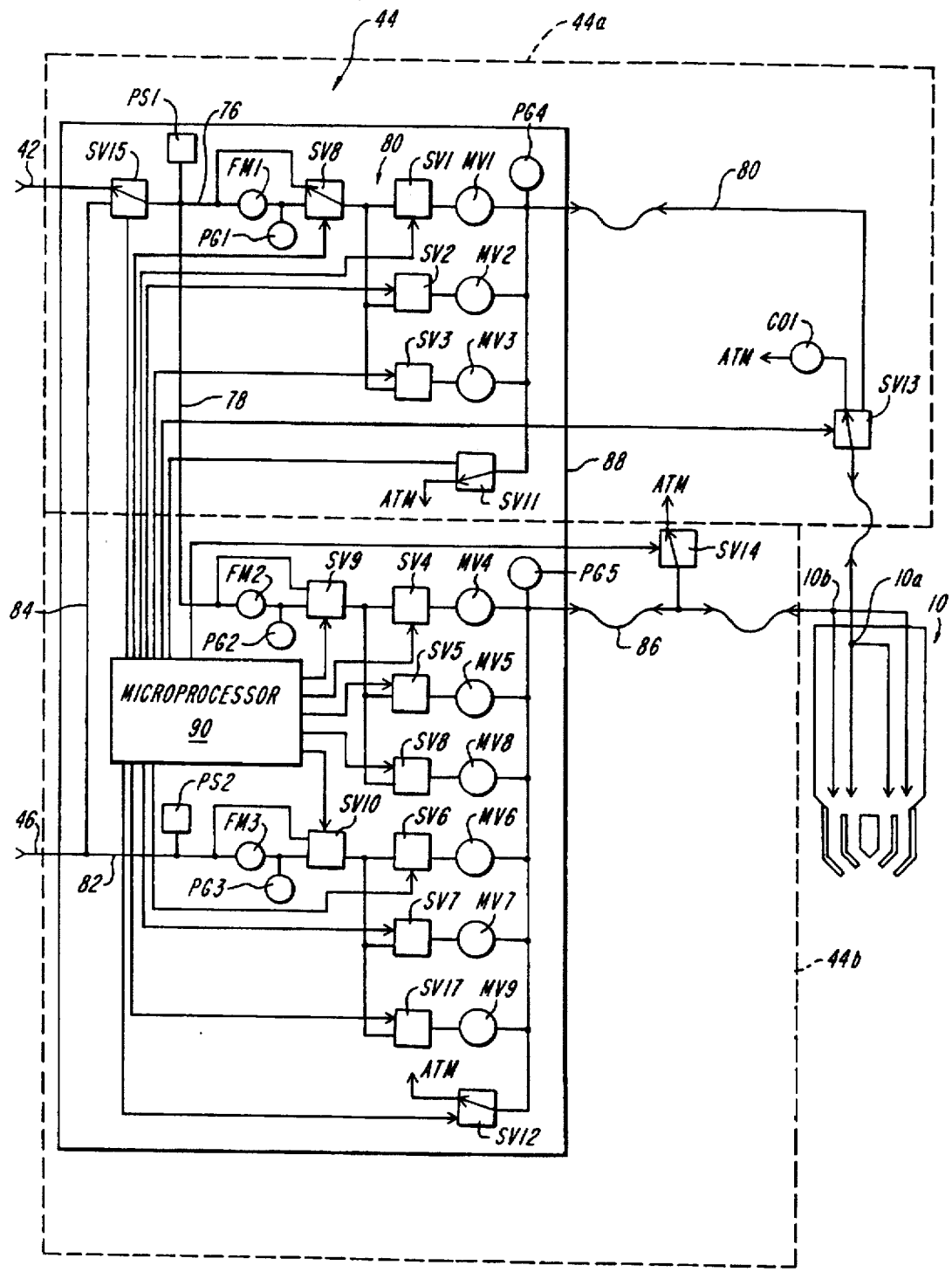
FIG. 4 is a schematic flow control circuit according to the present invention providing a mixed gas secondary gas flow at varying flow rates and with a quick charge and quick discharge capability.

FIG. 4 shows the gas flow control circuit 44 which controls the flow of plasma and secondary gases from sources 42 and 46 to the inlets 10a and 10b of the torch 10. The plasma gas, which for the purposes of this discussion will be taken as oxygen, flows from the source 42 through a nitrogen/oxygen solenoid selector valve SV15 (normally in the oxygen select position). It is then split into a plasma gas flow along line 76 and a secondary gas (oxygen portion) flow along line 78 to the oxygen feed line 86 in the secondary gas section 44b of the control 44. The secondary gas supply 46 feeds a conduit 82 which has a branch line 84 to the switch SV15 in the event that nitrogen is desired as the plasma gas, Pressure switches PS1 and PS2 in lines 76 and 82 do not allow the plasma cutting system to work if the pressure falls below a preset value.

In the preferred form shown, using oxygen as the plasma gas and a mixture of oxygen and nitrogen as the secondary gas, three feed lines 76, 78 and 82 are used. Each has a flow meter FM1, FM2, and FM3, respectively, and a pressure gauge PG1, PG2, PG3 connected in series with the flow meter. The flow meters ensure precise settings of the flow rates of both plasma and shield gas flows. Three bypass solenoid valves SV8, SV9 and SV10 are connected in parallel with the three flow meters, respectively. These valves are three way valves that are normally open to the bypass line. This serves to protect the flow meters during transient times and during steady state three valves are closed allowing the flow measurement.

Three normally closed solenoid valves are connected in parallel with each other at the downstream side of the flow meter for each line 76, 78 and 82. Each solenoid valve is followed by a needle valve. Each set of these solenoid valves has one that controls the preflow, one valve that controls the operating flow, and a third valve that provides for a quick charge. For oxygen plasma line 76, the preflow valve is SV2, the operating valve is SV1 and the quick charge valve is SV3. The associated needle valves are MV2, MV1 and MV3, respectively. For the oxygen secondary gas line, these three solenoid valves are SV5, SV4 and SV16, followed by needle valves MV5, MV4, and MV8, respectively. For the nitrogen secondary gas line, these solenoid valves are SV7, SV6, and SV17, followed by associated needle valves MV7, MV6, and MV9 respectively. The outputs from the valves SV4, SV5, SV6, SV7, SV16, and SV17 are combined to single secondary gas lead 86 connected to the secondary gas inlet 10b at the torch. The output of the oxygen and nitrogen secondary gas lines is therefore combined into a single flow to the torch.

The gas control circuit 44 also include four three way vent valves that are each normally open to atmosphere. They are also electrically actuated solenoid valves. Venting valve SV11 is connected to the oxygen plasma gas line at a gas console 88 that houses the gas control circuit 44. A like venting valve SV13 is also connected in line 80, but at the torch. This valve has a flow restricting orifice CO1 in the vent passage leading to atmosphere. It controls the decay of the plasma gas pressure in the nozzle on shut down. It is adjusted so that the gas pressure maintains the arc while the current is on, but rapidly dissipates the plasma gas pressure when the current is cut off. In the secondary gas feed line 86, a vent valve SV12 is connected to the line at the console 88 and a like valve SV14 is connected in the line at the torch. The gas circuit 44 also has pressure gauges PG4 and PG5 connected at the console 88 to the combined outputs from the preflow, operating flow and quick discharge valves. PG4 reads the oxygen plasma pressure on line 80, PG5 reads the secondary gas pressure on line 86.

During piercing the preflow valves are energized to open, with the operating valves and quick charge valve closed during most of the preflow. In this situation, the needle valves MV5 and MV7 control the mix ratio of the oxygen and nitrogen flows forming the secondary gas. As discussed above, this ratio is preferably set at about 2:1, but adjustments can be made to optimized the flow for the given operating conditions and to optimize varying cut parameters. Also, the preflow through the valves SV5, MV5, SV7 and MV7 is set at a flow rate many times greater than the operating flow rate set by valves SV4, MV4, SV6, MV6. A typical value for the total secondary gas preflow is 120 scfh, and 20 scfh for the operating flow. Suitable three way solenoid valves are manufactured by Automatic Switch Company under Model No. AFP33183 or by MAC Valves Inc. under Model No. 111B-111BAAA. The valves are all controlled by a central microprocessor 90 that is programmed to operate the gas control circuit 44 in the manner illustrated by the timing diagram of FIG. 5.

Figure 5:
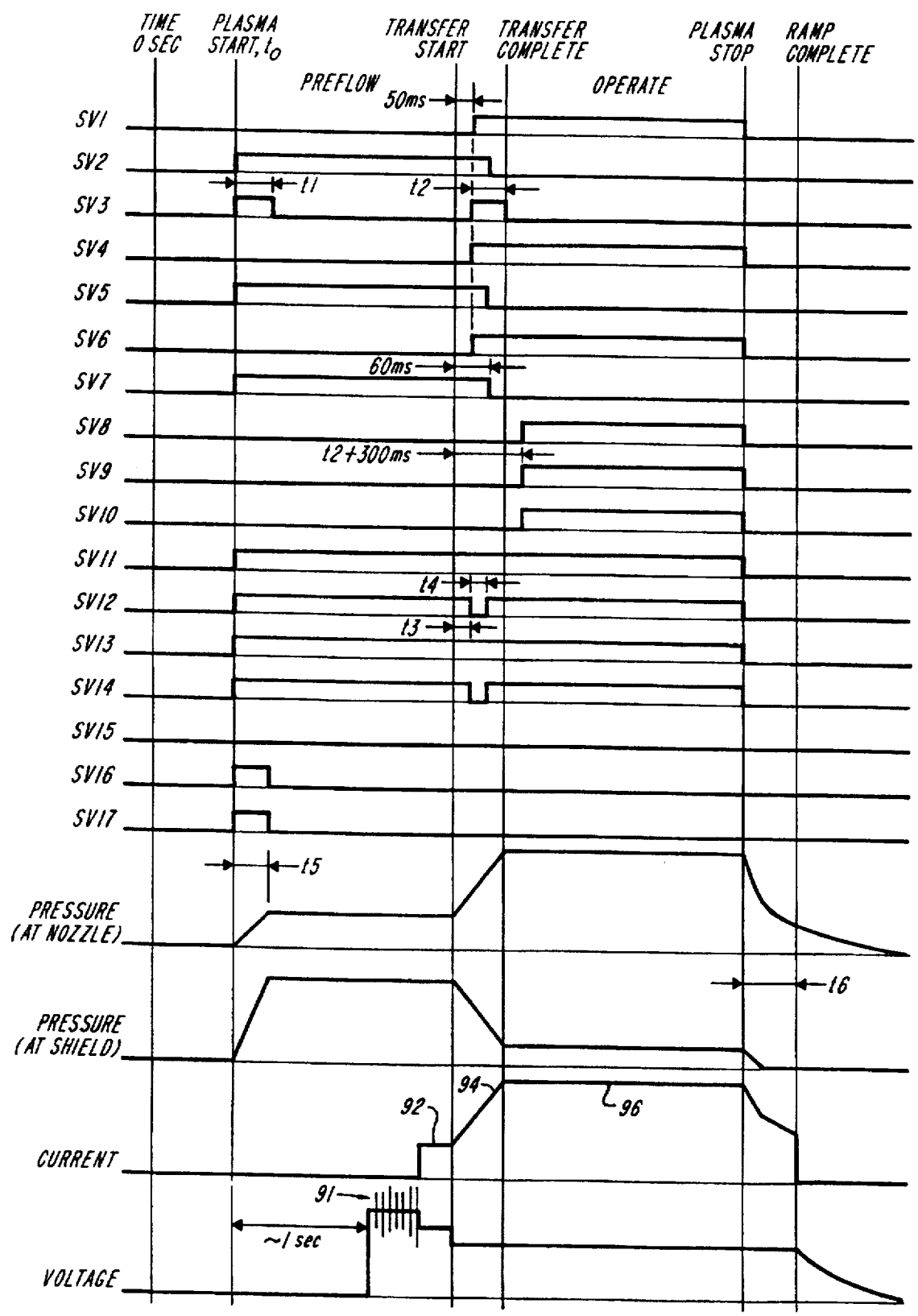
FIG. 5 is a timing diagram for the control circuit shown in FIG. 4.

FIG. 5 it illustrates the operating state of all of the valves in the circuit 44 during a full cycle of operation of the torch 10, from $t_0$ when a start signal is given to the system by an operator to a complete shut off of the arc current and gas flows at the end of $t_6$. FIG. 5 also shows the corresponding arc current, voltage, and gas pressures at the nozzle (in the plasma arc chamber) and the secondary shield gas pressure measured at the prechamber 58 between caps 66 and 72.

As soon as the start command is issued, the three preflow solenoid valves SV2, SV5 and SV7 are energized to open.

The four venting valves SV11, SV12, SV13 and SV14 are energized to closed position (they are normally open). The three quick charge valves SV3, SV16 and SV17 are also energized at the same time. The quick charge valves bring the nozzle and shield gas pressures up to their full preflow values in time $t_1$ for the plasma gas and in time $t_2$ for the shield gas. The quick charge valves work to quickly charge lines 80 and 86 because they allow the flows to bypass the flow restriction in the preflow and operating flow branches. They allow a sudden, step function increase in the flow. The preflow continues for a total elapsed time of 1 to 2 seconds, long enough to stabilize the preflows. As shown in FIG. 5, high voltage spikes 91 are applied at a high frequency to the torch after about 1 second of preflow to initiate a pilot arc, shown at 92. Once breakdown occurs for the pilot arc, the voltage falls.

At the transfer of the arc to the workpiece, the current is ramped up as shown at 94, to its operating level 96 at the completion of the transfer. The voltage drops on transfer and the gas pressure rises as the plasma gas in the torch at the nozzle is heated to extremely high temperatures and the gas flow is choked at the nozzle orifice 28a. During the transfer, piercing occurs. To provide the high velocity gas shield of the present invention, the large secondary gas preflow is maintained for about 60 ms after the beginning of the transfer. This high flow rate secondary gas preflow blows away molten metal splashed upwardly toward the torch before it can reach the torch itself. The flow surrounds the plasma jet and is radially inwardly directed. It interacts with the jet, but most of the flow turns and flows radially away from the jet sweeping outwardly and downwardly in the region between the workpiece and the lower end of the torch, It creates a moving, cool gas boundary between the cap 72 and the workpiece. This strong flow exists during piercing, but is greatly reduced during normal cutting. During cutting the mechanical shielding of the cap 72 protects the nozzle against double arcing.

After about 50 ms from the beginning of the transfer the plasma gas quick charge valve SV3 is reopened for a time $t_2$ to bring the plasma gas flow up to its full operating valve quickly. Also after 50 ms from the beginning of the transfer operating flow valves for both the plasma and shield gas open SV1, SV4, SV6. After a time $t_3$ from transfer, the two shield line vent valves SV12 and SV14 are opened briefly, for time $t_4$ as shown, to assist the pressure in the secondary line in falling to a level consistent with a much lower operating flow. This is the secondary gas quick discharge. The valves remain in these operating positions during operation except that the three flow meter bypass valves are energized about 300 ms after the commencement of transfer. This is after the flows reach their steady state values. To stop operation of the torch, a STOP command (i) deenergizes and closes the three operating valves SV1, SV4 and SV6, (ii) deenergizes the four vent valves to open them to atmosphere and thereby facilitate a quick discharge of the plasma and secondary gases, and (iii) deenergizes the flow meter bypass valves. From the STOP command to the end of $t_6$ the arc current is ramped down. At the end of $t_6$ it is cut off completely. There is a small residual pressure at the nozzle, but it rapidly dissipates so that there is substantially no strong swirling gas flow in the plasma chamber at current off, end of $t_6$. This condition has been found to be highly conducive to reducing electrode wear.

There has been described an apparatus and process for a plasma arc torch that protects the torch against double arcing on piercing and during cutting of sheet metal. There has also been described a gas shield for this protection using a very high flow of a secondary gas during the preflow only. The invention also describes an oxygen-rich secondary gas flow for the preflow on piercing and the operation flow that produces a significantly faster and higher quality cut than heretofore attainable using shielded torches or high definition torches. There has also been described a system for precisely controlling the gas flows to the torch, both primary and secondary, both preflow and operating flow, so that a high flow rate secondary gas can provide a gas shield, but the operating flow is low enough that it does not detract from the cut quality. This control is sufficiently rapid that the plasma arc is maintained well under control despite large and sudden charges in the gas flows through the torch. There has also been described a nozzle which particularly adapted to the high temperature, water-cooled operating environment of a high definition torch.

While this invention has been described with respect to its preferred embodiments, it will be understood that various modifications and variations will occur to those skilled in the art from the foregoing detailed description and the accompanying drawings. For example, while the invention has been described with respect to a high definition torch with two different gases, one oxidizing and the other non-oxidizing, the invention can be used in conventional torches and with a single type of gas. Use of a single gas, however, provides only the gas shield advantages, not the increased cutting speed, cut quality, or tunability inherent in the oxygen-rich gas composition preferred for use as the secondary gas for applications where an active gas such as oxygen is optimal for use as the plasma gas. Also, while a network of valves and vents actuated electronically under the control of a microprocessor has been described, other arrangements can be used to supply the plasma and secondary gases in the right mix, at the proper times, and with a high degree of precision in the timing. For example, rather than opening an extra line using a valve to quick charge, an independent source of high pressure gas can be suddenly and briefly opened to the main feed line to provide a step function increase in the flow rate. Also, while a flow restriction orifice and prechamber are used to create a pressure drop and enhance flow uniformity, other arrangements are possible. Further, while the invention has been described with respect to a swirl ring in the secondary gas flow path, a non-swirling secondary gas flow can also be used, although with some loss of performance. These and other modifications and variations are intended to fall within the scope of the appended claims.

What is claimed is:

1. A plasma arc cutting system comprising:
   a torch body including a plasma gas flow path for directing a plasma gas from a plasma gas inlet to a plasma chamber in which a plasma arc is formed and a secondary gas flow path directing a secondary gas flow from a secondary gas inlet to a secondary gas flow exit orifice;
   a nozzle mounted at a first end of the torch body and being formed of an electrically conductive material, the nozzle comprising (a) a hollow body portion formed having a generally conical, thin-walled configuration sloping toward an exit port for the plasma jet, and (b) a head portion formed integrally with the body portion (i) being generally solid except for a central passage aligned with the exit port, and (ii) having at least a partially conical outer surface sloping toward the exit port;
   an electrode mounted at the first end of the torch body in a mutually spaced relationship with the nozzle to define the plasma chamber;

a water-cooled cap mounted on the torch body and substantially enclosing the outer surface of the nozzle;

a secondary gas cap mounted on the torch body in a spaced relationship with the water-cooled cap to define a portion of the secondary gas flow path which includes the secondary gas flow exit orifice; and a swirl ring formed of an insulating material and positioned in the portion of the secondary gas flow path, the swirl ring configured to direct the secondary gas flow therethrough in a highly uniform flow.

2. The cutting system of claim 1 wherein the swirl ring comprises a set of canted holes which introduce a swirling movement to the secondary gas flow, thereby facilitating the interaction of the secondary gas flow with the plasma arc.

3. The cutting system of claim 1 wherein the nozzle has a diameter adjacent the body portion that exceeds the diameter of the body portion to define a cut back recess.

4. The cutting system of claim 1 wherein the secondary gas cap comprises a replaceable metallic shield having a central circular opening concentric with the exit port of the nozzle and sized to closely surround the plasma jet, the shield intercepting molten metal sprayed from the workpiece toward the torch during piercing and cutting.

5. The cutting system of claim 4 wherein the shield further comprises a set of ports that surround the central opening, and a seal located at the outer edge of the shield for sealing the shield to the body portion of the secondary gas cap.

6. The cutting system of claim 5 wherein the set of ports are sized to divert a significant portion of the secondary gas flow during the cutting, but not so divert a flow of the secondary gas at a higher rate associated with the piercing, the ports venting the high rate secondary gas flow upon termination for a flow for cutting.

7. The cutting system of claim 5 wherein the ports are angled to direct the secondary gas flowing therethrough radially away from the plasma jet.

8. The cutting system of claim 4 wherein the shield includes a shielding portion surrounding said central opening that extends generally parallel to the workpiece with an interior surface spaced from the exterior of the nozzle to define therebetween a main exit orifice for the secondary gas flow.

9. The cutting system of claim 4 wherein the shield includes a step recess formed on an outer edge to locate and lock the shield into the secondary gas cap and an annular groove formed in the outer edge and facing the secondary gas cap that is adapted to receive the seal.

10. The cutting system of claim 1 wherein the secondary gas flow is a mixture of a non-oxidizing gas, selected from the group consisting of nitrogen and argon, and at least 40% of an oxidizing gig, selected from the group consisting of oxygen and air, as measured by flow rate.

11. The cutting system of claim 1 wherein the secondary gas flow is a mixture of a non-oxidizing gas and at least 40% of an oxidizing gas, as measured by flow rate.

12. The cutting system of claim 11 wherein said ratio is about 2:1, oxidizing gas flow to non-oxidizing gas flow.

13. A plasma arc cutting system comprising:

a torch body including a plasma gas flow path for directing a plasma gas from a plasma gas inlet to a plasma chamber in which a plasma arc is formed and a secondary gas flow path directing a secondary gas flow from a secondary gas inlet to a secondary gas flow exit orifice;

a nozzle mounted at a first end of the torch body and having a central passage aligned with an exit port;

an electrode mounted at a first end of the torch body in a mutually spaced relationship with the nozzle to define the plasma chamber;

a water-cooled cap mounted on the torch body and substantially enclosing the outer surface of the nozzle; and a secondary gas cap mounted on the torch body in a spaced relationship with the water-cooled cap to define a portion of the secondary gas flow path which includes the secondary gas flow exit orifice; and a replaceable metallic shield for intercepting molten metal sprayed from the workpiece toward the torch during piercing and cutting, the shield having (i) a central circular opening aligned with the exit port of the nozzle and sized to closely surround the plasma jet, (ii) a set of ports that surround the central opening and are sized to divert a significant portion of the secondary gas flow during the cutting, but not so divert a flow of the secondary gas at a higher rate associated with the piercing, the ports venting the high rate secondary gas flow upon termination for a flow for cutting, and (ii) a seal located at the outer edge of the shield for sealing the shield to a body portion of the secondary gas cap.

14. The cutting system of claim 13 wherein the ports are angled to direct the secondary gas flowing therethrough radially away from the plasma jet.

15. The cutting system of claim 13 wherein the shield includes a shielding portion surrounding said central opening that extends generally parallel to the workpiece with an interior surface spaced from the exterior of the nozzle to define therebetween a main exit orifice for the secondary gas flow.

16. The cutting system of claim 13 wherein the shield includes a step recess formed on an outer edge to locate and lock the shield into the secondary gas cap and an annular groove formed in the outer edge and facing the secondary gas cap that is adapted to receive the seal.

17. The cutting system of claim 13 further comprising a swirl ring disposed in the secondary gas flow path adjacent the secondary gas flow exit orifice and configured to direct the secondary gas flow therethrough in a highly uniform flow.

18. The cutting system of claim 13 wherein the nozzle is formed of an electrically conductive material.

19. The cutting system of claim 13 wherein the nozzle further comprises:

a hollow body portion formed having a generally conical, thin-walled configuration sloping toward an exit port for the plasma jet; and an enlarged head portion formed integrally with the body portion and (i) being solid except for a central passage aligned with the exit port, and (ii) having at least a partially conical outer surface sloping toward the exit port.

20. The cutting system of claim 13 wherein the nozzle has a diameter adjacent the body portion that exceeds the diameter of the body portion to define a cut back recess.

21. The cutting system of claim 13 wherein the torch is a high definition torch.

22. The cutting system of claim 13 wherein the secondary gas flow is a mixture of a non-oxidizing gas and at least 40% of an oxidizing gas, as measured by flow rate.

23. A plasma arc cutting system comprising:

a torch body including a plasma gas flow path for directing a plasma gas from a plasma gas inlet to a plasma chamber in which a plasma arc is formed and a secondary gas flow path directing a secondary gas flow from a secondary gas inlet to a secondary gas flow exit orifice;

a nozzle mounted at a first end of the torch body and having (a) a central passage aligned with an exit port, (a) a hollow body portion having a generally conical, thin-walled configuration sloping toward the exit port, and (c) a head portion formed integrally with the body portion and being generally solid except for a central passage aligned with the exit port;

an electrode mounted at a first end of the torch body in a mutually spaced relationship with the nozzle to define the plasma chamber;

a water-cooled cap mounted on the torch body and substantially enclosing the outer surface of the nozzle; and a secondary gas cap mounted on the torch body in a spaced relationship with the water-cooled cap to define a portion of the secondary gas flow path which includes the secondary gas flow exit orifice, the secondary gas cap configured to define a recess within the secondary gas flow path; and a swirl ring formed of an insulating material and positioned in the recess within the secondary gas flow path, the swirl ring configured to direct the secondary gas flow therethrough in a highly uniform flow.

24. The cutting system of claim 23 wherein the swirl ring comprises a set of canted holes which introduce a swirling movement to the secondary gas flow, thereby facilitating the interaction of the secondary gas flow with the plasma arc.

25. The cutting system of claim 23 wherein the nozzle further comprises:

a hollow body portion formed having a generally conical, thin-walled configuration sloping toward an exit port for the plasma jet; and an enlarged head portion formed integrally with the body portion and (i) being generally solid except for a central passage aligned with the exit port, and (ii) having at least a partially conical outer surface sloping toward the exit port.

26. The cutting system of claim 23 wherein the secondary gas cap comprises a replaceable metallic shield having a central circular opening aligned with the exit port of the nozzle and sized to closely surround the plasma jet, the shield intercepting molten metal sprayed from the workpiece toward the torch during piercing and cutting.

27. The cutting system of claim 26 wherein the shield further comprises a set of ports that surround the central opening.

28. The cutting system of claim 27 wherein the set of ports are sized to divert a significant portion of the secondary gas flow during the cutting, but not so divert a flow of the secondary gas at a higher rate associated with the piercing, the ports venting the high rate secondary gas flow upon termination for a flow for cutting.

29. The cutting system of claim 27 wherein the ports are angled to direct the secondary gas flowing therethrough radially away from the plasma jet.

30. The cutting system of claim 26 wherein the shield includes a shielding portion surrounding said central opening that extends generally parallel to the workpiece with an interior surface spaced from the exterior of the nozzle to define therebetween a main exit orifice for the secondary gas flow.

31. The cutting system of claim 26 wherein the shield includes a seal located at the outer edge of the shield for sealing the shield to the body portion of the secondary gas cap.

32. The cutting system of claim 31 wherein the shield includes a step recess formed on an outer edge to locate and lock the shield into the secondary gas cap and an annular groove formed in the outer edge and facing the secondary gas cap that is adapted to receive the seal.

33. The cutting system of claim 26 further wherein the water-cooled cap and the secondary gas cap, in combination, produce a flow rate of the secondary gas during the piercing that is very high in comparison with the flow rate during cutting in the transferred arc mode.

34. The cutting system of claim 23 wherein the nozzle has a diameter adjacent the body portion that exceeds the diameter of the body portion to define a cut back recess.

35. A plasma arc cutting system comprising:

a torch body including a plasma gas flow path for directing a plasma gas from a plasma gas inlet to a plasma chamber in which a plasma arc is formed and a secondary gas flow path directing a secondary gas flow from a secondary gas inlet to a secondary gas flow exit orifice;

a nozzle mounted at a first end of the torch body and having a central passage aligned with an exit port;

an electrode mounted at a first end of the torch body in a mutually spaced relationship with the nozzle to define the plasma chamber;

a water-cooled cap mounted on the torch body and substantially enclosing the outer surface of the nozzle; and a secondary gas cap mounted on the torch body in a spaced relationship with the water-cooled cap to define a portion of the secondary gas flow path which includes the secondary gas flow exit orifice;

a replaceable metallic shield having a central circular opening aligned with the exit port of the nozzle and sized to closely surround the plasma jet;

a seal positioned in a step recess formed on an outer edge of the shield to locate and lock the shield into the secondary gas cap of the shield and an annular groove formed in the outer edge of the shield and facing the secondary gas cap that is adapted to receive the seal; and a swirl ring formed of an insulating material and positioned within the secondary gas flow path, the swirl ring configured to direct the secondary gas flow therethrough in a highly uniform flow.

* * * * *